Patented July 6, 1937

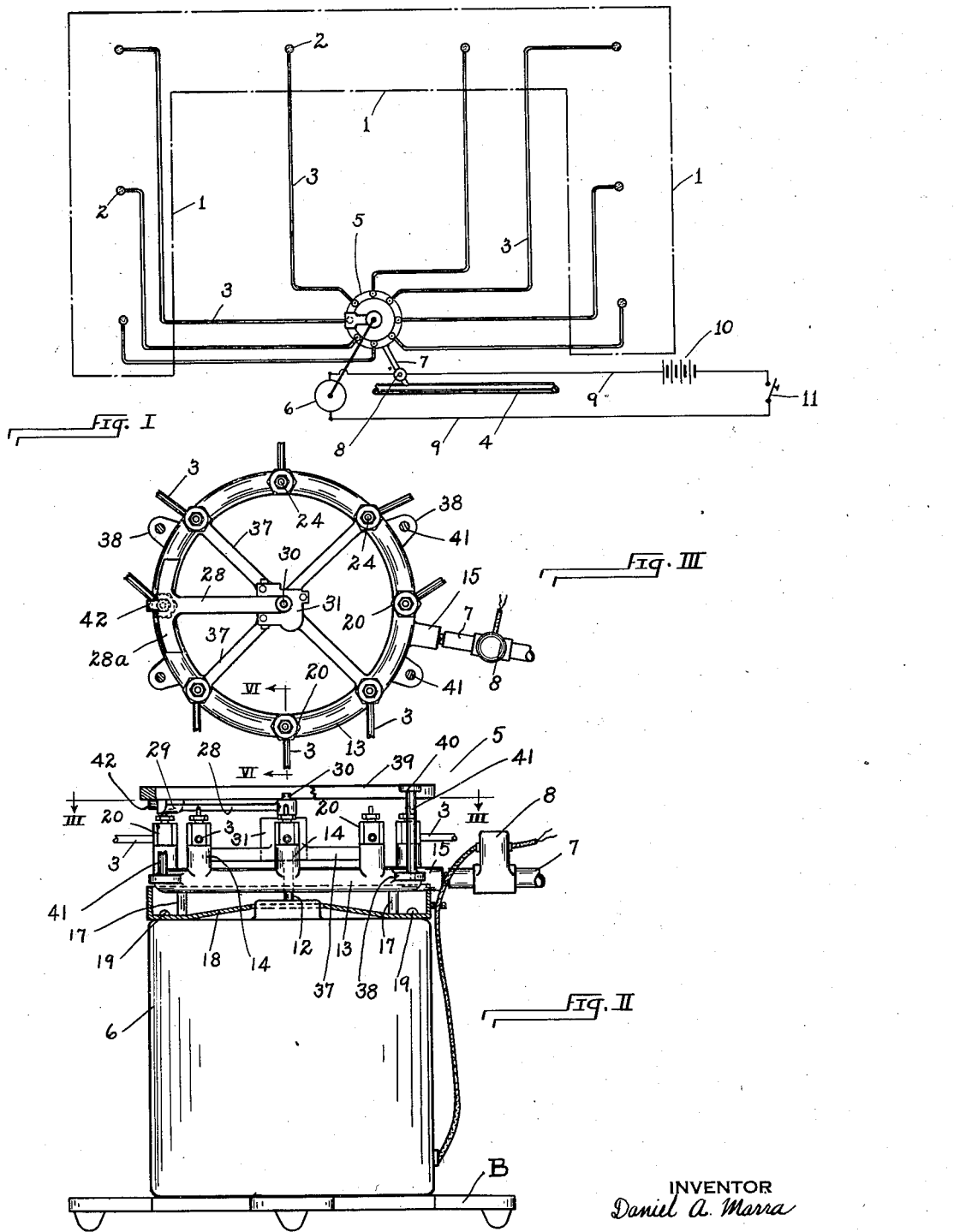

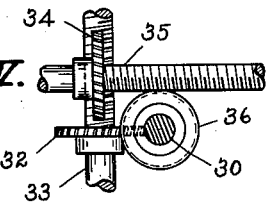
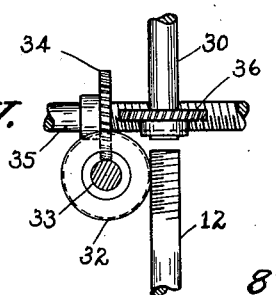
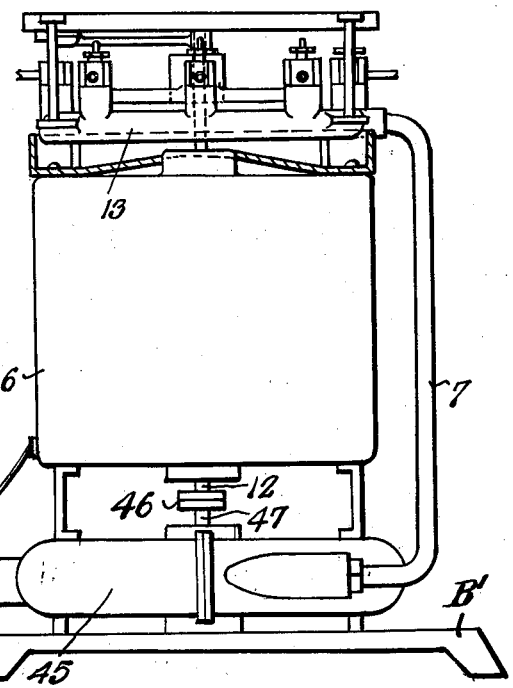
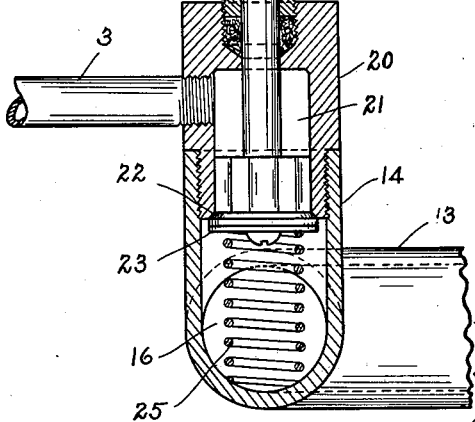
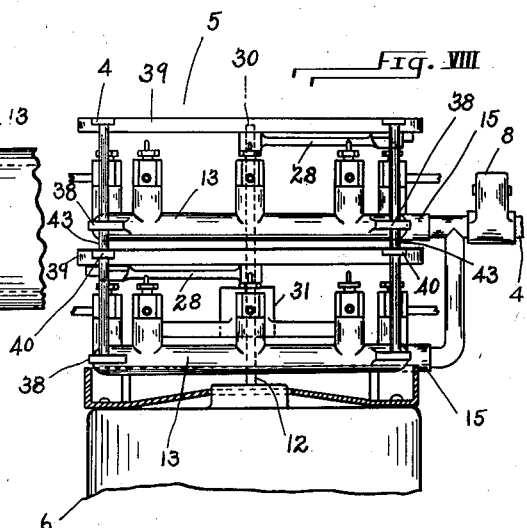

2,085,916

UNITED STATES PATENT OFFICE 2,085,916

AUTOMATIC DISTRIBUTOR FOR SPRINKLER SYSTEMS

Daniel A. Marra, Oakmont, Pa.

Continuation of application Serial No. 732,644, June 22, 1934. This application August 24, 1935, Serial No. 37,782

8 Claims. (Cl. 137—78)

The invention relates to sprinkling systems; that is, to apparatus for sprinkling lawns, gardens, or other areas to be watered. This application comprises a continuation of application Serial No. 732,644, filed by me on or about the 22nd day of June, 1934.

Essentially a system of this sort comprises a plurality of conduits extending from a source of water supply to various parts of the area to be watered. Water-spraying nozzles are connected to the conduits; the nozzles are arranged in spaced-apart relation in such area, and in service each nozzle is adapted to cover a fractional portion of the area with its spray, while the several nozzles are adapted to cover the whole. Ordinarily, it is impractical or undesirable to water the whole of an area at one time, the better practice being to water one portion and then another, until the entire area has been covered.
Communication between the water supply and the nozzle-feeding conduits is controlled by a distributor, and in the case of each conduit the distributor operates automatically in alternately establishing and interrupting such communication. Thus, the several nozzles are brought successively into play, each for a predetermined interval, until all nozzles have been operated and the whole area has been sprinkled.

My invention lies in an improved automatic distributor which is particularly, although not exclusively, adapted for service in sprinkling systems, and, by way of illustration, the invention will be described as it is embodied in such a system.
By virtue of my invention, I reduce the number of parts required in an automatic distributor; I obtain greater economy in manufacture, provide simpler construction, provide for more ready assembly, provide for more ready inspection of the distributor in service, reduce maintenance costs, and reduce the space required for an installation.

In the accompanying drawings Fig. I is a diagrammatic view of a sprinkling system embodying my distributor; Fig. II is a view, partly in side elevation and partly in vertical section, of the distributor; Fig. III is a view of the distributor, taken on the plane III—III of Fig. II; Figs. IV and V are diagrammatic views, showing in plan from above and in front elevation, respectively, the particular gearing embodied in the distributor; Fig. VI is a fragmentary, sectional view of the distributor manifold, taken on the plane VI—VI of Fig. III, and showing to larger scale certain details in construction; Fig. VII is a view comparable with Fig. II, illustrating a modification in the structure of the automatic distributor; and Fig. VIII is a fragmentary view, showing in side elevation a distributor embodying a plurality of manifold units assembled in accordance with my invention.

Referring to the drawings, the reference numeral 1 indicates an area, say, a lawn, to be watered, and 2 indicates water nozzles which are connected, by conduits 3, to a water supply pipe 4. As usual in water supply systems, the water in pipe 4 is under hydraulic pressure.

Advantageously, the conduits 3 are formed of copper tubing; the conduits are buried several inches beneath the surface of the ground, and each nozzle 2 also is buried, conveniently to such depth that its mouth lies flush with or a little below the surface of the lawn. Thus, the nozzles and conduits are out of sight, and will not interfere with mowers used in trimming the lawn.

Interposed between the supply line 4 and the conduits 3 is a distributor 5 in which the features of my invention are embodied. The distributor is adapted automatically to bring the conduits 3 successively into communication with the supply line. The distributor may be located above ground—conveniently, in the cellar of the home, or in the garage. As will presently be described in greater detail, the distributor includes an electric motor 6; when the motor is energized, one conduit 3 after another is brought into communication with the supply line 4, and, during the interval in which a particular conduit 3 is in communication with such supply line, the nozzle (or nozzles) connected to the particular conduit is caused to sprinkle water upon so much of the lawn as is within the reach of its spray.

A conduit 7 establishes communication between the supply main 4 and the distributor 5, and an electrically operated valve 8 controls such communication.

The electrically operated valve 8 is a known commercial structure, and so far as concerns this invention it will suffice to say that the valve includes a magnetic element (not illustrated) which is effective to draw the valve member away from its seat. So long as the magnetic element is energized, the valve 8 remains open, and water flows from the main 4 and into the distributor. When, therefore, the motor 6 and the valve 8 are electrically energized, the sprinkling system automatically operates.

The motor 6 and valve 8 may be connected in common, by circuit wires 9, to any suitable source (10) of electric energy; the circuit wires 9 include a switch 11, which, when in closed position, completes or closes the common energizing circuit of the motor and valve.

My distributor advantageously embodies the motor 6 in unit assembly. As shown in Fig. II, the motor 6 is organized with the shaft 12 of its rotor extending vertically; the several elements of the distributor proper are organized above the motor, and a base B is secured to the bottom of the motor, whereby the assembly may stand as a unit on any convenient supporting surface. The distributor includes a tubular doughnut-shaped manifold 13, and integrally formed with this manifold is a plurality of upwardly extending, tubular bosses 14; the bosses 14 are spaced-apart circumferentially of the circular manifold 13, and the manifold also includes a laterally extending tubular boss 15, by means of which the inlet pipe 7 is connected to the manifold. The manifold is equipped with a plurality of legs 17 which in service stand united with a drip pan (or trough) 18, and the pan 18 is secured, say by screws 19, to the frame or housing of the motor 6. The pan 18 is serviceable in catching any water which might leak from the manifold structure and tend to fall into the field windings or armature of the motor.

Referring particularly to Fig VI, it will be understood that each tubular boss 14 opens into the chamber 16 within the manifold. Each boss is internally threaded, and a header 20 is united in threaded engagement therewith; the header includes a chamber 21 which opens through a valve seat 22; a valve 23 is mounted upon a vertically movable stem 24, and a compression spring 25, organized between the wall of the manifold 13 and the head of the valve, tends to maintain the valve in seated position. The valve stem 24 projects through the top wall of the header 20, and is equipped at its tip with an anti-friction bearing 26. A packing gland 27 is organized in well-known manner to prevent escape of liquid between the valve stem and the wall of the header. One or more of the nozzle-feeding conduits 3 is secured to each header 20, and communicates with the chamber 21 above the head 23 of the valve.

It will be understood that, when the valve stem is forced downward, water under supply pressure in the manifold chamber 16 will flow upward into chamber 21, and thence will enter the conduit 3, whereby the nozzle 2 connected to such conduit will come into play, and will remain in play until the stem 24 is moved upward and the valve is restored to its seat 22.

The organization of the valve is such that the pressure of the water in the manifold 13 tends to hold the valve in seated or closed position; that is to say, the water pressure aids the spring 25 in its function. I contemplate that in some cases the spring may be eliminated, and that the water pressure alone may serve normally to hold the valve in seated position.

The several headers 20 are equispaced in the circular extent of the doughnut-shaped manifold 13, and I provide a rotary member, having its axis of rotation concentric with the manifold, to effect in automatic succession the depressing of the valve stems 24. The rotary member consists of an arm 28 whose distal end carries or includes a cam 29 (Fig. II). The arm 28 is secured to a shaft 30 which derives its rotation, through a gear box 31, from the shaft 12 of motor 6. The motor and reduction gearing cause the arm 28 slowly to rotate, and, in the course of such rotation, the cam 29 at the end of the arm successively sweeps across the tips of valve stems 24. Thus, one after another the valves 23 are opened and closed, and water is intermittently fed first to one conduit 3 and then to another. The distal end of the arm 28 is laterally or arcuately extended, as shown at 28a in Fig. III, so that, during the continuous rotation of the arm, the engagement of the cam 29 (formed on the nether face of arm portion 28a) with each valve stem 24 is maintained for an appreciable interval of time. Accordingly, each valve 23 is held in open position, and each conduit 3 is held in communication with the water supply for a definite interval. In the present case, the parts are so designed and proportioned with respect to the speed of motor 6 that the valves are severally held open for approximately one minute, whereby the nozzles severally connected to the conduits severally remain in play for one minute. More specifically, the arm 28 is geared to make one revolution in eight minutes, and in arcuate extent the terminal 28a of the arm is equal to one-eighth of the mean circumference of the manifold 13.

The normal speed of an electric motor is relatively high, say 1750 R. P. M., and it will be understood that one revolution of the arm 28 in eight minutes is a relatively slow rotation to obtain from such a motor. Considerable difficulty was experienced, not so much in providing gearing to obtain the required speed reduction as in providing adequate gearing that could, advantageously, be incorporated in a small housing (31) within the compass of the manifold 13, as shown in Figs. II and III.

The vertical motor shaft 12 extends upward into the gear housing, and its upper end is threaded, providing a worm pinion which meshes with a worm gear 32 mounted on a horizontal shaft 33, as shown in Figs. IV and V. The shaft 33 carries a worm pinion meshing with a worm gear 34 secured to a second horizontally disposed shaft 35 which extends angularly to and at an interval above the shaft 33; a second vertical shaft 30, axially aligned with the motor shaft 12, carries a worm gear 36 which meshes with the worm pinion on shaft 35. The shaft 30 extends above the housing 31 and carries the distributor arm 28. The speed ratio of the shaft 30 to the motor shaft 12 is 1:14000, and it will be manifest that the organization of gearing within the small confines of box 31, to accomplish such speed reduction, is particularly valuable in a distributor of unit construction.

It will be observed that the gear housing 31 is integrated with the manifold 13 by means of several supporting arms or spokes 37. It will be perceived that the manifold 13 and the supporting members 37 comprise a wheel-like structure having a circular chamber 16 embodied within the rim of the wheel, with bearing provided for the shafts 12 and 30 in the hub of the wheel. The cross-sectional extent of the peripheral chamber is relatively small with respect to the radius of the wheel. It will be further observed that the manifold 13 carries four lateral plugs 38. A guide ring 39 is provided, and the guide ring is similarly provided with lugs 40. The guide ring is mounted concentrically of and above the manifold 13, by means of stays 41, each secured at its opposite ends to oppositely arranged lugs 38, 40, as shown in Fig. II. The distributor arm 28 includes a finger 42 which bears upon the nether face of the guide ring, whereby the distal end of the rotating arm is supported against the upward thrusts resulting from the successive engagements of the cam 29 with the valve stems 24.

The sprinkling system illustrated in Fig. I includes only eight conduits 3, and, accordingly, the distributor manifold is provided with eight valve headers 20. In case more conduits 3 are desired in a particular installation, the manifold 13 may be constructed with a greater number of valve headers—the headers may be arranged in closer juxtaposition circumferentially of the manifold. And, of course, the manifold may be radially enlarged, to permit a greater number of valve headers to be included. But manifestly only a limited number of additional valve headers may, in keeping with good practice, be added to a single manifold.

A feature of my invention resides in the ready interchangeability of manifolds; that is to say, two, three, or more manifold units may be readily incorporated in compact, unit assembly, whereby any desired number of valve headers may be employed. And it is characteristic of such multiple organization of manifolds that the distributor arms 28 of each may be driven in common through a single gear box 31 and by means of a single electric motor.

In Fig. VIII, for purposes of illustration, two superposed manifolds 13 are shown in such unit assembly. The upper manifold is united to the lower, by means of stays 43, secured to the lugs 38, 40, already mentioned. The upper manifold 13 is not provided with gear reduction box 31, the shaft 30 being continued upward from the lower distributor unit and carrying the distributor arms 28 of both units. The electromagnetic valve 8 is organized between the water supply main and the distributor in such way as to control the supply of water to both manifolds 13. Thus, several manifolds 13 may be organized one on top of another, to obtain in a given installation the desired number of independently and automatically controlled conduits 3. Manifestly, in case the number of headers exceeds the required number of conduits 3 in a given installation, one or more of the headers 20 may be removed and the vacated boss 14 plugged.

Many times in the field the water supply pressure is inadequate to produce the desired operation, and, in further refinement of my invention, I organize a pump in unit assembly with the distributor. Referring to Fig. VII, a pump 45 is organized in the line between the water supply main and the manifold 13, the pump being a rotary pump of well-known structure. Advantageously, the pump is secured in the assembly between the base B' and the motor 6; the axis of the pump's rotor extends vertically and in line with the shaft 12 of the motor, and a simple coupling 46 serves to unite the motor shaft with the shaft 47 of the pump. The pump 45 receives water from line 4 at supply pressure, and feeds it (through line 7) into the manifold 13 at the desired increased pressure. Thus, by virtue of my simplified unitary structure, it is possible to obtain automatically operated sprays—sprays which are each effective over a large area of ground. And it will be understood that diminution in water supply pressure will have little or no effect upon the operation of the system.

I claim as my invention:

1. In an automatic distributor, the combination of a manifold including an inlet and a plurality of outlets, valves controlling said outlets, and valve-operating members in circular arrangement externally of said manifold, an electric motor, means including an element connected to said motor and rotatable about an axis concentric with said circular arrangement of valve-operating members for shifting such members, alternately to open and close said outlets, and a guide for supporting the radially outward portion of said rotatable element against thrust, as described.

2. In an automatic distributor, the combination of a manifold including an inlet and a plurality of outlets, valves controlling said outlets, valve-operating members arranged circularly, a guiding ring spaced from said operating members, and means for automatically shifting said valve-operating members, which means include an element rotatable between said guiding ring and said members.

3. An automatic distributor unit comprising a housed electric motor mounted on end on a base and with its shaft extending vertically, a circular manifold assembled above said motor, with the housing of the motor providing basal support for the manifold, said manifold including a plurality of valve-controlled outlets, and means connected to the upper end of the vertical shaft for operating the valves controlling said outlets, said means including a gear-train arranged within the circular compass of said manifold.

4. An automatic distributor unit comprising a housed electric motor mounted on end on a base and with its shaft extending vertically, a circular manifold assembled above said motor with a drip trough interposed between, and with the housing of the motor providing basal support for the manifold, said manifold including a plurality of valve-controlled outlets, and means connected to the upper end of the vertical shaft for operating the valves controlling said outlets, said means including a gear-train arranged within the circular compass of said manifold.

5. A distributor manifold comprising a wheel-shaped body of cast metal including at the hub of the wheel a housing and speed-reducing gearing in said housing and including in the rim of the wheel a peripherally extending chamber circular in plan and of relatively small cross-sectional extent with respect to the radial distance between said rim of the wheel and its hub, and a plurality of outlets communicating with said chamber.

6. A distributor manifold comprising a wheel-shaped body of metal including in the rim of the wheel a peripherally extending chamber of relatively small cross-sectional extent with respect to the radius of the wheel, and spokes extending radially inward from the peripheral body of the wheel and merging in a hub portion housing speed-reducing gearing and providing bearing for a shaft cooperating with said gearing, and a plurality of outlets communicating with said peripheral chamber.

7. An automatic distributor unit comprising a base carrying in assembly a pump having a rotor arranged vertically, an electric motor arranged on end with its rotary drive shaft extending vertically, a circular manifold including a plurality of outlets, valves severally controlling said outlets, and means for operating said valves, said rotary pump and said manifold being arranged in vertical axial alignment with said electric motor interposed between, with the rotary drive shaft of the motor projecting above and below the motor housing for connection to the rotor of said pump and to said valve-operating means.

8. An automatic distributor including in interchangeable assembly a plurality of circular manifold units, said manifold units being arranged in parallelism and being spaced apart in vertical axial alignment, the manifold units being severally provided with inlets and a plurality of outlets, valves severally controlling said outlets, means arranged with each manifold for successively operating said valves, a base, an electric motor arranged on end on said base with its shaft extending vertically and in alignment with the aligned manifolds, a gear-train embodied in the assembly within the circular compass of said manifolds, and means for connecting the gear-train in common with the valve-operating means of the several manifolds.

DANIEL A. MARRA.